UNITED STATES PATENT OFFICE.

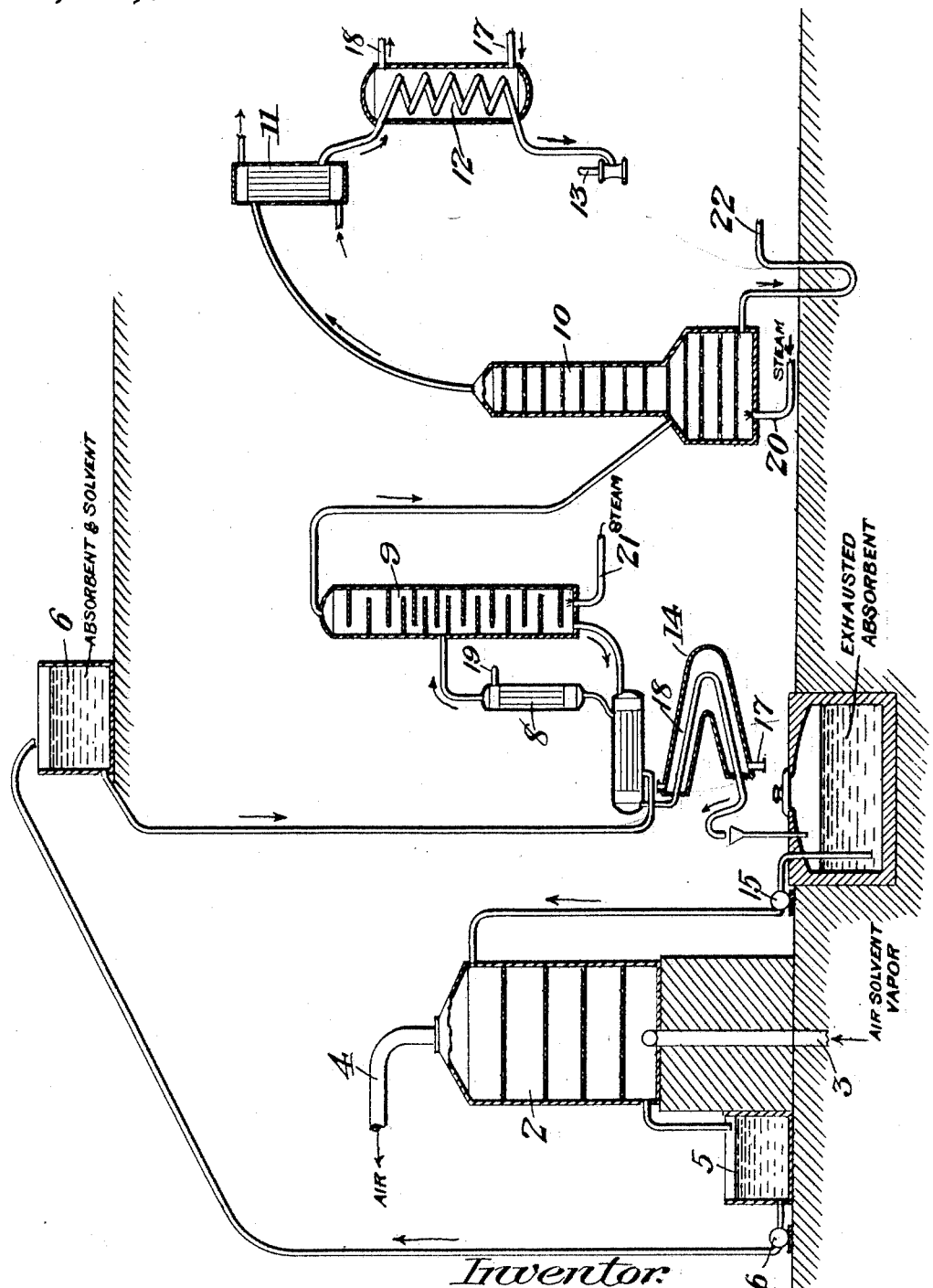

JEAN HENRY BRÈGEAT, OF PARIS, FRANCE.

APPARATUS FOR THE RECOVERY OF VOLATILE SOLVENTS IN CONTINUOUS PROCESS.

1,315,701. Specification of Letters Patent. Patented Sept. 9, 1919.

Application filed June 6, 1918. Serial No. 238,593.

*To all whom it may concern:*

Be it known that I, JEAN HENRY BRÈGEAT, engineer, of 6 Rue Saint Georges, at Paris, Department of the Seine, France, citizen of the French Republic, have invented certain new and useful Improvements in Apparatus for the Recovery of Volatile Solvents in Continuous Processes; and I do hereby declare the following to be a full, clear, and exact description of the invention, such as will enable others skilled in the art to which it appertains to make and use the same.

The present invention has for its object an apparatus or a plant for the continuous recovery of volatile solvents such as ether, ethyl alcohol and many others actually lost in the course of manufacture or discharged into the atmosphere in industries using these volatile solvents.

The process of this recovery may be of the kind described in the U. S. patent application Serial Number 189,662 "Process for the recovery of volatile solvents" filed Sept. 4th, 1917.

According to this process the gaseous mixtures including the volatile solvents are treated with suitable absorbing reagents such as phenol, cresol and others capable under favorable conditions of absorbing the volatile substances contained in the atmosphere or other gaseous mixtures, giving rise to the formation of complex combinations. These complex combinations are capable of dissociation either by heating or by entraining by steam from which results the easy liberation of the volatile solvents which are condensed so as to be used again in manufacture. The reagents freed from the volatile solvents are cooled and being regenerated reënter into circulation.

The accompanying drawing shows by way of example an arrangement of known devices constituting the apparatus of the present invention.

The plant comprises the following essential devices: A tank for the absorbing reagents 1; an absorption column with trays 2 in which the circulation of the gaseous mixture charged with one or another or two or several of the volatile solvents which it is desired to recover takes place from the bottom to the top, the mixture entering the apparatus at 3 and leaving it at 4. Two reservoirs 5, 6 for the reagents having dissolved therein one or several of the volatile bodies, a heat-recovery device 7, a steam heater 8, a cascade evaporator 9, a distillation column 10, a condenser 11 for the volatile bodies and the steam, a water-cooling device 12, a flow meter 13 for the products of condensation from 12, a water-cooling device 14, for the reagents freed from volatile bodies, which reagents after cooling are conducted into the tank 1 for use again, and two pumps 15, 16.

The cooling devices 12 and 14 are fed by a current of circulating water, which enters at the bottom of the apparatus at 17, and leaves at the top by the pipe 18.

A suitable steam-generator, not shown in the drawing feeds the steam heater 8 at 19, and serves through 20 and 21 to inject the steam into the distilling column 10 and the evaporator 9.

A suitable fan, not shown in the drawing, causes the gaseous mixture charged with the volatile bodies to enter by the orifice 3 and leave by the orifice 4. These volatile bodies are absorbed by the cresols in the column 2.

The operation of the apparatus is as follows:

The absorbing reagents are conducted by any suitable means into the tank 1 and forced by the pump 15 on to the first tray at the top of the column 2. The reagents descend by gravity from tray to tray, circulating from the top to the bottom, the gaseous mixture charged with the volatile bodies circulating from the bottom to the top. At the bottom of the column 2 the cresols charged with volatile substances are extracted by a pump 16, which forces them into the reservoir 6. The gaseous mixtures escape by the orifice 4, completely freed from the substances which were diffused in them.

The reagents pass from the reservoir 6 to a heat recovering device 7. They are there heated by means of the heat carried by the absorbing reagents, which are hot and deprived of the volatile bodies, leaving the evaporator 9. From the outlet of the device 7, the bodies charged with the volatile bodies pass into a steam heater 8 where they are raised to a temperature such that the volatile bodies alone, or mixtures of them in various proportions, begin to distil.

The reagents pass from the heater 8 into the evaporator 9, where a column of steam entrains the portions of the volatile bodies which escape the action of the heater 8.

The volatile bodies and the liberated steam rise mixing together in 9 and are carried to the distilling column 10, then to the condenser. The more volatile product is condensed in 12 and escapes by the meter 13. The less volatile products escape at 22 with the water and are successively separated in suitable distilling columns, not shown in the drawing.

As to the absorbing reagents flowing from 9 freed from the volatile bodies which they had absorbed, they are returned to the tank 1 for use again after having been sufficiently cooled in the heat recovering device 7 mentioned above, then in the water cooling device 14.

I claim:

1. A plant for the recovery of volatile solvent from gaseous mixtures containing the same, such plant comprising a washing column having a plurality of trays therein, means for introducing the gaseous mixtures at the bottom of said column, means for introducing absorbing agents at the top of said column, a receptacle for receiving the absorbing agents containing absorbed solvents from said column, a direct vapor heated still for distilling the absorbed solvents from the absorbing agents, an indirect-vapor-heater for heating such material before the same enters said still, and a heat exchanger for heating the material about to enter said indirect heater by the heat of the non-vaporized constituents leaving said still, a rectifying column for separating the more volatile solvents from the less volatile solvents in the vaporous product of said still, a condenser for the more volatile solvents, means for further cooling the absorbing agents after leaving the still, a heat exchanger, and connections for again returning the cooled absorbing agents to the said washing column.

2. A plant for the recovery of volatile solvents from gaseous mixtures containing the same, said plant comprising a column, means for conveying a gaseous mixture containing vaporized solvents into the bottom of said column, means for conveying a liquid absorbing agent into the top of said column, a receptacle for receiving the absorbing agent containing absorbed solvents from said column, a direct-steam still for separating the absorbed solvents from the absorbing agent, a heat exchanger for transferring heat from the unvaporized product of such still to the mixed liquor about to enter said still, and an indirect-steam heater between such heat exchanger and such still, a rectifying column for the vapors leaving such still, a condenser for such vapors, and connections for further cooling the absorbing agent partly cooled in said heat exchanger and for returning the same to said column.

In testimony whereof I affix my signature, in presence of two witnesses.

JEAN HENRY BRÈGEAT.

Witnesses:
A. JACANET,
CHAS. P. PRESSLY.